United States Patent Office 3,462,297
Patented Aug. 19, 1969

3,462,297
ACID FUME STABILIZED SPANDEX
Bertie J. Reuben, Harold D. Kay, and Julian J. Hirshfeld, Decatur, Ala., and Earl H. Hartgrove, Jr., Parsippany, N.J., assignors to Monsanto Company, St. Louis, Mo., a corporation of Delaware
No Drawing. Filed Aug. 25, 1966, Ser. No. 574,898
Int. Cl. B44d 1/22; C08g 22/04
U.S. Cl. 117—138.8                              4 Claims

ABSTRACT OF THE DISCLOSURE

Gas fume fading of spandex fiber, a long-chain polymer comprised of at least about 85% segmented polyurethane, is stabilized against undesirable yellowing or dulling of said fiber by incorporating from about 0.25% to 15% by weight of spandex fiber of an organic acid chloride, such as acetyl chloride, lauroyl chloride, etc.

---

This invention concerns a process of treating spandex fibers. More particularly, the invention relates to a process of treating spandex fibers with organic acid chlorides to inhibit the gas fading tendency of these fibers.

Spandex fibers, due to their stretch characteristic, have found a wide application in the textile industry. These fibers however have certain disadvantages in that on storage and upon exposure to atmospheric conditions they are subject to acid fume discoloration which results in undesirable yellowing or dulling of the fibers. This discoloration can be off-set to some extent by tinting or by using a masking agent, but such materials often cause the fibers to display undesirable color characteristics since their purpose is merely to mask and not to inhibit the formation of the undesirable yellow coloring or dulling.

It is an object of this invention to provide a process of inhibiting the gas fume fading of spandex fibers.

Another object of this invention is to provide color-stabilized articles comprised of spandex fibers.

Still further, it is an object of this invention to provide a process of inhibiting the fading of spandex fibers from exposure to oxides of nitrogen and other acid fumes and to articles comprised of spandex fibers treated by this process.

Other objects of this invention will become apparent as the invention is fully developed within the specification.

These and other objects of this invention are accomplished by providing a process of acid fume stabilizing a spandex fiber comprising incorporating in the fiber a stabilizing quantity of an acid chloride containing the radical —COCl wherein the free valence of the radical is satisfied by an organic group having no substituents reactive with said radical.

The term "spandex fiber" as used herein is defined in its generic sense to mean a manufactured fiber in which the fiber-forming substance is a long-chain synthetic polymer comprised of at least about 85% of a segmented polyurethane. The invention is not limited merely to spandex fibers but is applicable to films, woven fabrics, non-woven fabrics and any shaped article substantially composed of a spandex fiber producing polymer; therefore, the term "spandex fiber" as used herein is meant to define the above enumerated items. The segmented polyurethanes contain the recurring linkage —OCONH— and are generally prepared by a process which comprises reacting a polymeric diol with an organic diisocyanate and thereafter extending the reaction product thereof with a compound containing two active hydrogen atoms such as water, hydrazine, organic diamines, glycols, amino alcohols, etc. The diols may be a polyether glycol such as polyalkylene ether glycols, polyalkylene arylene ether glycols, polyalkylene ether-thioether glycols, and the like, or polyester glycols including polyester glycols which are the reaction products of dibasic acids with glycols as well as those derived from lactones, either with or without internal extension. The diisocyanates employed are generally arylene diisocyanates and preferably a para oriented symmetrical aromatic diisocyanate. The chain-extending agent is a compound having two active hydrogen atoms, i.e., a difunctional active hydrogen-containing compound, as determined by the tests described in J. Am. Chem. Soc. 49, 3181 (1927). Of the chain-extending agents, the organic diamines are preferred. The reactants useful in preparing such segmented polyurethanes, including the glycols, the organic diisocyanates, and the chain-extending agents, are well known in the art. Examples of useful segmented polyurethanes are found in U.S. Patents 2,871,227 and 3,115,384.

The organic acid chlorides useful with the invention include compounds containing the radical

wherein the free valence of the radical is satisfied by an organic group having no substituents reactive with said radical. Such compounds include those having the formula

organic diacid chlorides having the formula

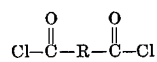

and organic polyacid chlorides having the formula

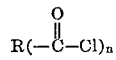

wherein R is selected from the group consisting of alkyl, aryl, aralkyl and alkaryl and n is an integer greater than 2. The R groupings can contain from about 1 to about 18 or more carbon atoms; however, the 18 carbon atom limit is not to be considered as a limitation for the purpose of this invention. The R groupings can be substituted but the substituents should not be reactive with the —COCl radical. Also the acid chloride can be oxalyl chloride. Specific examples of organic acid chlorides useful to inhibit the gas-fading tendency of spandex fibers include acetyl chloride, oxalyl chloride, propionyl chloride, butyryl chloride, isobutyryl chloride, adipyl chloride, benzoyl chloride, octanoyl chloride, p-toluyl chloride, terephthalyl chloride, sebacyl chloride, b-naphthoyl chloride, lauroyl chloride, myristyl chloride, palmityl chloride, and stearyl chloride. A particularly preferred acid chloride is acetyl chloride.

The amount of organic acid chloride useful to acid fume stabilize the spandex fiber can vary from about 0.25% to about 15% or more, the percents based on weight of the spandex fiber. The optimum amount preferred will depend on the particular spandex fiber, i.e., factors such as the particular type of spandex fiber, the fiber geometry, porosity, etc., will influence the optimum amount of acid chloride desired on the spandex fiber. Also, for reasons of economy, the amount of acid chloride should be kept as low as possible. Preferably, amounts of the acid chloride within the range of from about 0.5% to about 5% are recommended.

The organic acid chloride can be incorporated into the spandex fiber by any method which intimately contacts the fiber with the acid chloride. For example, the acid chloride can be dissolved in a solvent which is non-reactive with the fiber and with the acid chloride, e.g. carbon tetrachloride, and the fiber contacted with the resulting solution by such means as immersion, padding, exhaust bath, etc. The acid chloride can be dissolved in a solution of a spandex fiber producing dope and the solution spun into fibers by usual extrusion techniques, e.g. dry spinning, or the solution can be cast into a film or a shaped object by conventional techniques. Also, the acid chloride can be applied to the spandex fiber by incorporating the acid chloride into the spin finish applied to the fiber immediately after the fiber is extruded. Still further, the acid chloride can be incorporated into the spandex fiber by contacting the fiber with vapors of the acid chloride or vapors of the acid chloride dissolved in a solvent. Other like methods are also useful with the invention.

Contacting the fibers with the acid chloride can be effected at any temperature and for any time period as long as such is sufficient to insure that an acid fume stabilizing quantity of the acid chloride is retained on the spandex fiber. For example, the spandex fiber can be contacted at temperatures within the range of from about room temperature up to about the boiling point temperature of the acid chloride or a solution containing the acid chloride. Where the spandex fiber is contacted with vapors of acid chloride, the temperature can exceed the boiling point temeprature of the acid chloride. The contact time can vary from a few seconds to minutes or hours. Where the contact time is for a few seconds, e.g. the spandex fibers are padded at room temperature, it is preferred that the spandex fibers be subsequently treated at a higher temperature for a short period of time to ensure adequate fixation of the acid chloride on the spandex fiber, for example for about 5 minutes at about 300° F.

As mentioned previously, the organic acid chloride can be incorporated into the spandex fiber by contacting the spandex fibers with the acid chloride or a solution of the acid chloride dissolved in a suitable solvent which is inert to the spandex fibers and will not react with the acid chloride. Suitable solvents include carbon tetrachloride, xylene, petroleum ether, mineral spirits, kerosene, or any other like petroleum solvent.

The nature or character of the product resulting from the incorporation of the acid chloride with the spandex fiber is not fully known. It is believed that the acid chloride reacts with reactive nitrogen atoms within the spandex fiber, e.g. —NH— within the urethane groups or urea groups or —$NH_2$ amino end groups if present in the spandex fiber. The result of the acid chloride and reactive nitrogen reaction prevents the otherwise reaction of these nitrogen atoms with acid fumes, such as oxides of nitrogen, which act to discolor the spandex fiber. The result of this reaction leaves residual HCl on the fiber. Washing of the fiber removes the HCl but in some cases small residual amounts of the HCl are left on the fiber and, as a result, are detrimental to ultraviolet stability of the fiber. Where the latter occurs, it is desirable to further treat the spandex fiber with a weak base such as tetrasodium pyrophosphate to neutralize the residual HCl.

Spandex fibers treated by this invention exhibit improved acid fume stability or improved gas-fading properties. Such treated fibers are durable to washing, etc.

The following examples are presented to further illustrate the invention. Each sample within the following examples are tested for acid fume fading or gas fading according to AATCC Standard Test Method 23–1962, as described at pages B–79–B–81 of The Technical Manual of the American Association of Textile Chemists and Colorists (1965). The results of the test are rated numerical on a scale from 1 to 5 as determined by the International Geometric Gray Scale. A rating of 1 indicates a poor gas-fade rating (i.e. the original shade of the sample is much changed due to the gas-fading) and a rating of 5 indicates a very good gas-fading rating (i.e. there is little or no change in the shade of the sample).

In the following examples, percents are based on weight unless otherwise specified.

EXAMPLE 1

A spandex fiber is obtained by extrusion of a solution resulting from mixing a first solution containing a prepolymer composed of a dimethylformamide solution containing a polycaprolactone internally extended with toluene dissocyanate and this solution mixed with methylene diphenylisocyanate, with a second solution containing ethylenediamine dissolved in dimethylformamide.

A tubular knit sample composed of the above spandex fiber is scoured for 30 minutes at 160° F. in an aqueous bath containing 1% Igepal CO–710 (an alkylphenoxypoly (ethyleneoxy)-ethanol, marketed by General Aniline & Film Corp., Dyestuff and Chemical Div. 140 W. 51st St., New York, N.Y.) and 0.5% of trisodium phosphate The sample is then rinsed in warm water and dried. Thereafter the sample is padded at room temperature with a solution containing 1% adipyl chloride and the residue carbon tetrachloride, dried at 200° F. for 5 minutes and is then maintained at 300° F. for 5 minutes. The sample is then tested for gas fading and the results are indicated in Table I (a control sample, i.e. a sample that has not been treated with the adipyl chloride, is presented for comparison purposes):

TABLE I

| Sample: | Gas fade rating |
|---|---|
| (a) Control | 1 |
| (b) Test (treated with adipyl chloride) | 4 |

These above data indicate that the gas fading tendency of spandex fibers is improved by incorporating adipyl chloride into the fibers.

EXAMPLE 2

Tubular knitted samples of spandex fiber described in Example 1 are scoured for 15 minutes at 180° F. in an aqueous bath containing 0.25 gram per liter of tetrasodium pyrophosphate, 0.25 gram per liter of Triton X–100 (an alkylarylpolyether alcohol, marketed by Rohm & Haas Co., 222 W. Washington Square, Philadelphia, Pa) and 20 milliliters per liter of kerosene. The samples are then rinsed in warm water. Thereafter, the samples are again scoured for 15 minutes at 180° F. in an aqueous bath containing 0.25 gram per liter of tetrasodium pyrophosphate and 0.25 gram per liter of Triton X–100. The samples are rinsed in warm water and are then dried. Thereafter, the samples are contacted with an acid chloride by one of two methods as outlined in Table II, i.e. the samples are padded or immersed in a solution containing an acid chloride as indicated in this table. After the samples are contacted with the acid chloride, they are rinsed in warm water and dried for 5 minutes at 200° F. The samples are then tested for gas fading and the results are indicated in Table II (sample "1" is a control sample presented for comparison purposes):

of this test are indicated in Table IV (a control sample treated identically as the test sample except it is not con-

TABLE II

| Sample No. | Method of contacting of the spandex fibers | Composition of solution containing the acid chloride | Gas-fade rating |
|---|---|---|---|
| a | Padded at room temperature, rinsed in warm water and then dried. | 1% adipyl chloride dissolved in carbon tetrachloride. | 4 |
| b | do | 5% adipyl chloride dissolved in carbon tetrachloride. | 3–4 |
| c | do | 10% adipyl chloride dissolved in carbon tetrachloride. | 3 |
| d | Immersed for 10 minutes at 60° F., rinsed in warm water and then dried. | 1% adipyl chloride dissolved in carbon tetrachloride. | 3 |
| e | Padded at 105° F., rinsed in warm water and then dried. | do | 3–4 |
| f | Padded at 140° F., rinsed in warm water and then dried. | do | 3–4 |
| g | Padded at room temperature, rinsed in warm water and then dried. | 1% adipyl chloride dissolved in mineral spirits. | 4 |
| h | do | 1% adipyl chloride dissolved in benzene. | 4 |
| i | do | 1% adipyl chloride dissolved in perchloroethylene. | 4 |
| j | do | 1% adipyl chloride dissolved in xylene. | 4 |
| k | do | 1% adipyl chloride dissolved in petroleum ether. | 3–4 |
| 1 (control) | | | 2–3 |

EXAMPLE 3

Spandex tubular knit samples are washed in two cycles, each cycle consisting of agitating the sample for 5 minutes at room temperature in a carbon tetrachloride solution and then evaporating the carbon tetrachloride from the sample. The samples are then padded at room temperature with a carbon tetrachloride solution containing 1% of an acid chloride indicated in Table III. The samples marked $a_1$, $b_1$, $c_1$, $d_1$, and $e_1$ are rinsed in warm water and then immersed for 5 minutes in a boiling aqueous solution containing 5% sodium carbonate. All of the samples are then rinsed in warm water, dried for 5 minutes at 200° F. and then tested for gas fading. The acid chloride used on each sample and the results of the gas fading test are indicated in Table III:

TABLE III

| Sample No. | Acid chloride | Gas-fade rating |
|---|---|---|
| a | Adipyl chloride | 3–4 |
| $a^1$ | do | 3 |
| b | Sebacyl chloride | 3–4 |
| $b^1$ | do | 3 |
| c | Lauroyl chloride | 3 |
| $c^1$ | do | 3 |
| d | Octanoyl chloride | 4 |
| $d^1$ | do | 3–4 |
| e | Acetyl chloride | 4 |
| $e^1$ | do | 3–4 |
| f (control) | | 2 |

EXAMPLE 4

Spandex tubular knit samples are scoured for 30 minutes at 160° F. in an aqueous bath containing 1.0% Igepal CO-710 and 0.5% tetrasodium pyrophosphate. The samples are rinsed in warm water and then dried. Thereafter, the sample is placed in a dessicator containing acetyl chloride on the bottom thereof and the dessicator is evacuated of air. The sample is maintained at room temperature in the dessicator for 6 hours. Thereafter the sample is removed from the dessicator, rinsed in warm water and dried for 5 minutes at 200° F. The sample is then tested for acid fume fading and the results tacted with the acetyl chloride, is presented for comparison purposes):

TABLE IV

| Sample | Treatment | Gas-fade rating |
|---|---|---|
| a | Acetyl chloride | 3–4 |
| b (control) | | 1 |

The above examples are presented to specifically illustrate working embodiments of the invention. It is to be understood that this invention is not limited to these specific embodiments, but as many widely different embodiments of the invention may be used without departing from the spirit and scope of this invention.

What is claimed is:

1. A spandex fiber stabilized against acid fume discoloration by having incorporated therein from about 0.25% to about 15% by weight of said fiber an organic acid chloride defined by the formula RCOCl wherein R is selected from the group consisting of alkyl and aryl, said R having no substituents reactive with said organic acid chloride.

2. The spandex fiber stabilized against acid fume discoloration as recited in claim 1 wherein the organic acid chloride is defined by the formula ClOCRCOCl.

3. The spandex fiber stabilized against acid fume discoloration as recited in claim 1 wherein the organic acid chloride is defined by the formula $R(COCl)_n$ wherein $n$ is an integer greater than 2.

4. A spandex fiber stabilized against acid fume discoloration by having incorporated therein from about 0.25% to about 15% by weight of said fiber of an organic acid chloride selected from the group consisting of acetyl, adipyl, octanoyl, sebacyl and lauroyl.

References Cited

UNITED STATES PATENTS

| 2,871,227 | 1/1959 | Walter | 260—858 |
| 3,115,384 | 12/1953 | Cacella et al. | 161—172 |
| 3,310,428 | 3/1967 | Maloney | 117—145 |
| 3,385,653 | 5/1968 | Whitfield | 117—141 |
| 3,386,942 | 6/1968 | Bell et al | 260—45.7 |

WILLIAM D. MARTIN, Primary Examiner

J. E. MILLER, Assistant Examiner

U.S. Cl. X.R.

8—115.6; 260—45.7